United States Patent [19]
Crecine

[11] Patent Number: 6,049,806
[45] Date of Patent: Apr. 11, 2000

[54] COMPUTER SYSTEM FOR MANAGING A PLURALITY OF DATA TYPES

[75] Inventor: John Patrick Crecine, Atlanta, Ga.

[73] Assignee: Multimedia Archival Systems, Inc., Atlanta, Ga.

[21] Appl. No.: 08/837,268

[22] Filed: Apr. 11, 1997

[51] Int. Cl.[7] .................................................. G06F 17/30
[52] U.S. Cl. .............................. 707/200; 707/1; 707/3; 707/104
[58] Field of Search .................................. 707/104, 2, 3, 707/4, 5, 6, 200, 10, 1, 204, 205

[56] References Cited

U.S. PATENT DOCUMENTS

| | | | |
|---|---|---|---|
| 5,430,872 | 7/1995 | Dahod et al. | 395/600 |
| 5,581,706 | 12/1996 | Jessup, Jr. et al. | 395/200.13 |
| 5,659,742 | 8/1997 | Beattie et al. | 395/615 |
| 5,675,788 | 10/1997 | Husick et al. | 395/615 |
| 5,680,639 | 10/1997 | Milne et al. | 395/806 |
| 5,713,021 | 1/1998 | Kondo et al. | 395/614 |
| 5,729,741 | 3/1998 | Liaguno et al. | 395/615 |
| 5,734,893 | 3/1998 | Li et al. | 395/615 |
| 5,742,816 | 4/1998 | Barr et al. | 395/615 |
| 5,745,895 | 4/1998 | Bingham et al. | 707/10 |
| 5,752,029 | 5/1998 | Wissner | 395/615 |
| 5,752,244 | 5/1998 | Rose et al. | 707/5 |
| 5,754,851 | 5/1998 | Wissner | 395/615 |
| 5,799,318 | 8/1998 | Cardinal et al. | 707/104 |
| 5,826,237 | 10/1998 | Macrae et al. | 705/2 |

OTHER PUBLICATIONS

Dunlop et al. "Providing Access to a Multimedia Archive Using the World Wide Web and an Object–Relational Database Management System" Computing & Control Engineering Journal, pp. 221–226, Oct. 1996.

Park et al. "A Presentation Scheduling Scheme for Multimedia Databases" IEEE Database, pp. 284–289, Jul. 1996.

Kuo et al. "A Content–Based Query Language for Video Databases" Proceedings of Multimedia '96, pp. 209–214, Sep. 1996.

*Primary Examiner*—Paul V. Kulik
*Assistant Examiner*—Michael J. Wallace, Jr.
*Attorney, Agent, or Firm*—Troutman Sanders LLP

[57] ABSTRACT

A computer system for managing a plurality of data types. Particularly, this invention relates to a computer system for capturing instruction data, including audio, image, charts, CAD, text, numeric and background data, from an instructor and/or searched data, including text, numeric, database, diagnostic, CAD, audio and image data, for use in teaching and learning about, as well as analyzing, different subject matter.

24 Claims, 15 Drawing Sheets

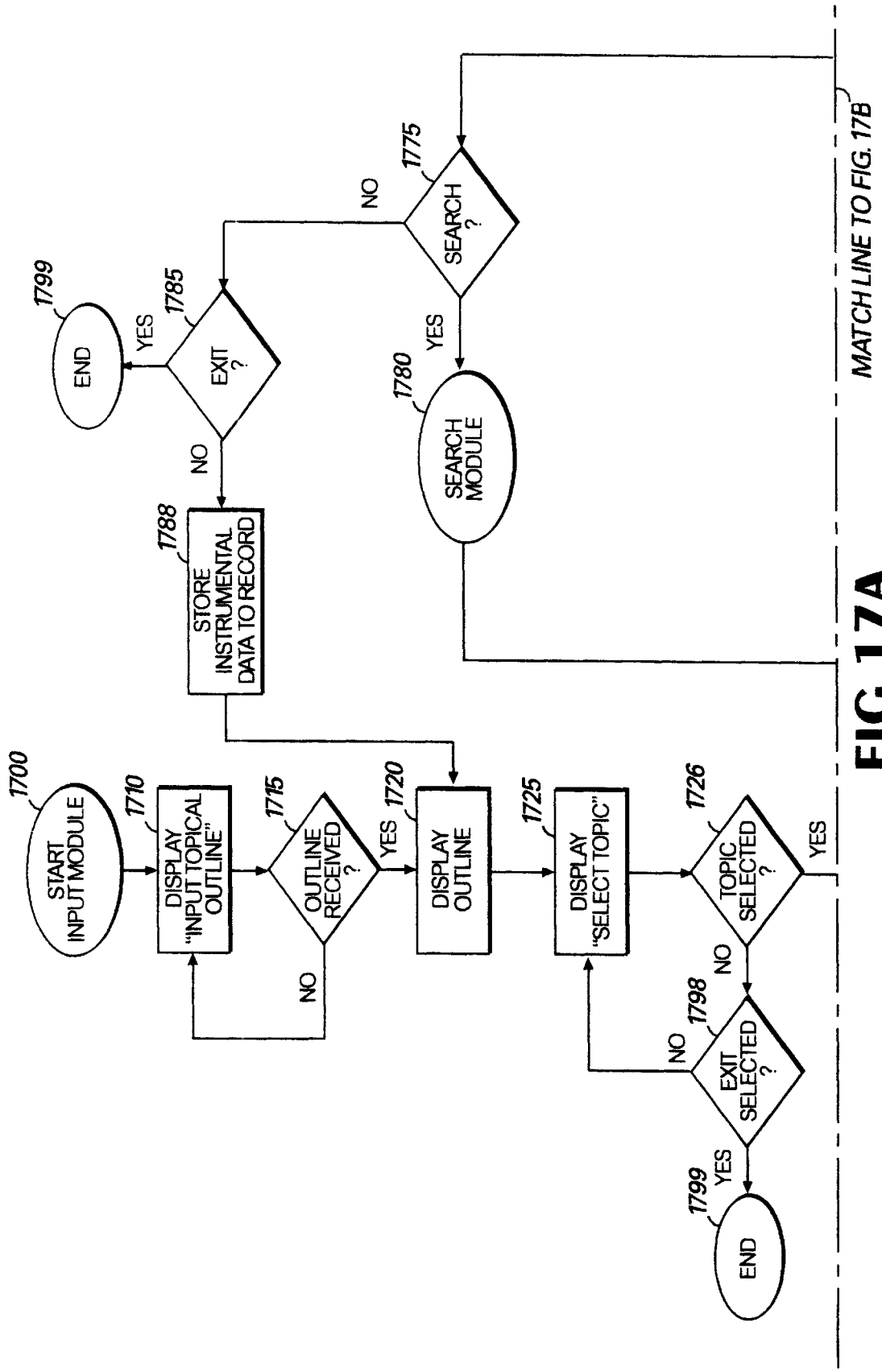

TOPIC RECORD - 2000

| TIME SLOT | AUDIO DATA | TEXT DATA | BACK-GROUND DATA | SEARCH DATA |
|---|---|---|---|---|
| 1/1000 | | | | |
| 2/1000 | | | | |
| 3/1000 | | | | |
| 4/1000 | | | | |
| 5/1000 | | | | |
| 6/1000 | | | | |

FIG.20

COMPUTER SYSTEM FOR MANAGING A PLURALITY OF DATA TYPES

BACKGROUND OF THE INVENTION

1. Technical Field

This invention relates generally to a computer system for managing a plurality of data types. Particularly, this invention relates to a distributed computer system for capturing instructional data, including audio, image, charts, CAD, text, numeric and background data, from an instructor and/or searched data, including text, numeric, database, diagnostic, CAD, audio and image data, using search engine technology for use in teaching and learning about, as well as analyzing, different subject matter.

2. Description of the Prior Art

Recently, computers have become much more powerful and faster and when linked together in a system allow users to communicate almost instantaneously around the world. However, as computer technology improves, new challenges exist in connection with the managing of huge amounts of data (information), the managing of different types of data and the managing of such data in different formats.

An example of a computer system that manages large amounts of data of various types and formats is a personal computer system including auxiliary components, such as a microphone, speakers, a graphic tablet, a mouse and a keyboard. Such a computer system allows a user to input a presentation consisting of a variety of data. For example, the presentation may include audio data using the microphone, text and diagnostic data using the graphic tablet and keyboard and monitor background (overlay) data using the graphic tablet. The data is then synchronously stored in time slots of a record. The user may also edit the presentation data by rewinding, fast forwarding, playing, pausing and stopping the data in the various time slots by using the mouse to click on a button on the monitor which displays each command and re-inputting the data into the time slots.

A user may then view the presentation data by viewing the monitor to perceive the text and background data and listening to the audio data with the speakers. The user may also control the presentation by rewinding, fast forwarding, playing, pausing and stopping the data the various time slots by using the mouse to click on the respective button on the monitor.

This computer system performs especially well in instructor/student settings. Specifically, this prior art computer system allows a teacher to create a more perfect presentation by using the edit capabilities and allows an endless number of students to observe the presentation at their own pace and on their own time.

Nonetheless, this computer system has a major shortcoming. Specifically, this computer system is not capable of allowing the instructor, nor the student, to instantly search and add further data (information) from other computer sources to the different segments of the presentation. In other words, this type of computer system does not have the capability of searching, retrieving, indexing and storing such data from other computer sources with the specific segments of the presentation for later viewing by a user.

An example of another computer system that manages large amounts of data of various types and formats is search engine technology. This computer system technology has the capability of allowing a user to input a search criteria on the monitor of the computer system and search storage means connected to the computer system, including local server hard drives and remote server websites on the Internet. Accordingly, this search engine technology allows a user to capture a variety of data, including text, audio, image and database data. The user may then view the variety of data to obtain further knowledge on a topic. Nonetheless, this computer system does not have the capability of allowing a user to select certain data to be retained, automatically linked (cross-referenced) and stored.

SUMMARY OF THE INVENTION

The present invention recognizes and addresses the above-discussed shortcomings and disadvantages, as well as others. In accordance with the teachings of the present invention, a novel computer system and method for capturing a plurality of data for teaching and learning about, as well as analyzing, different subject matter is disclosed.

More specifically, the present invention comprises a computer system and method for capturing instructional data, including audio, text and background data, from an instructor for use in teaching and learning. Additionally, the computer system and method of the present invention include the capability of capturing searched data, including text, numeric database, diagnostic, CAD, audio and image data, for use in teaching and learning.

In a preferred embodiment, an instructor uses a personal computer and auxiliary components to input the instructional data of a form generally associated with a lecture or personal explanation of a complex topic, device or phenomenon. Initially, the instructor is prompted to input a topical outline setting forth the different topics to be covered during a presentation. A record representative of each topic is then created. Each record includes fields for storing audio data, text data, background data and searched data. Each field also includes a plurality of time slots associated with a plurality of time periods for data streams.

The instructor inputs the instructional data for each topic by executing a "record" command and using a variety of components connected to the personal computers. Specifically, a microphone is used to input the audio data and a graphic display tablet is used to input the text data from the instructor's writing and background data (e.g., chalkboard, overlay images) selected by the instructor. Accordingly, an instructor may create a presentation on a topic by talking and writing about the topic while changing the background as needed and have all of this captured in the various consecutive time slots of each field for the topic record. If an instructor chooses to edit the presentation, then the instructor may execute a variety of commands, such as "play", "fast forward" or "rewind" to locate the particular time slot to begin editing. The instructor may then input new audio, text and background data and have it captured over the prior instructional data in the consecutive time slots of each field.

Further, at any time while inputting the instructional data an instructor may choose to search for and add search data from a storage means in the computer system, such as local servers (in a LAN or WAN) and/or remote servers (websites on the Internet) by executing a "search" command. To initiate the search, the instructor is prompted to input a search criteria, while the instructional data from the plurality of fields for the selected time slot is displayed. The computer system then searches the various storage means using a search engine, such as Informix's Universal Server (formerly Illustra), which allows text data, database data, audio data and image data to be searched at the same time. The most relevant data retrieved during the search is then displayed to the instructor, and the instructor is prompted to select the data to be retained for the current time slot of the topic. All of the selected data is then automatically indexed, linked (cross-referenced) and stored in the appropriate time slot of the search data field for the current topic record. Further, the lecturer may also edit (delete, add to or modify) the searched data.

To illustrate, as shown in FIG. 6, an instructor could choose to complement a presentation on telecommunications by searching for data related to Alexander Graham Bell. Accordingly, as shown in FIG. 7, the search could retrieve text data related to Bell's life story, database data related to the specifications of the telephones he invented, audio data related to a speech given by Bell on his quest to invent the telephone and image data related to a picture of Bell in his work shop. Of importance, this data could be retrieved from any storage means on the computer system, including a CD-ROM running on a local server or an Internet Website located on a remote server in another country.

The above is repeated until the instructor has completed the presentation for all the topics in the outline. The presentation may then be stored on the hard drive of the personal computer or server and/or copied on to a compact or floppy disk for later use.

A student may use the presentation by retrieving it from the computer system or disk and selecting a topic from the topic outline. Next, the student executes the "play" command, and the audio (assuming speakers are connected), text and background data for the particular topic are all synchronously displayed by time slot. Accordingly, the student may view the presentation much like being in a classroom. However, the student may also execute commands, such as "stop", "pause", "rewind", "fast forward" and "play" to adapt the presentation to the wants and needs of the student.

Additionally, anytime during the presentation and just like the instructor as described above, the student may also choose to search for and add search data from a storage means in the computer system, such as a Website. Accordingly, the student may search and add data in particular time slots of the search data field for the current topic record to compliment any and all parts of the instructor's presentation for viewing at a later time.

As may be inferred from the above, a presentation may consist of many types of data (information) that can be viewed simultaneously by the user/student/instructor and may also be augmented by other data, such as user/student notes that can be embedded in a presentation. A "presentation" is a particular configuration of data linked together in a common time line. Other configurations or linkages of data are possible and are under control of the user. Arbitrary configurations of individual data records are also under control the user, as well as configurations of individual data records of different data types that can be created, stored, and retrieved.

The user-controller configuration of particular, diverse data records is partially automated in the present invention through the integrated action of various search engines, corresponding to the different data types of interest to the user. Based on a general query by the user (e.g., launched by a key word or phrase from within a presentation), a particular configuration of data records is assembled using a series of searches of all data available, either through local storage or a local network of servers, or on a wide area or world wide network of servers. The records returned as a result of comprehensive searches are automatically linked (automatically cross referenced), based on the initial search criteria. Particularly relevant, linked records can be stored, accessed, and retrieved according to user-defined criteria and the other records may be discarded.

Both presentation and user-defined configurations of information require the ability of the user to view and manipulate multiple data records simultaneously and intuitively. The "multiple window" user interface component of this invention provides this feature. Both presentation and user-defined configuration of information require the ability of the user to view and manipulate prototype data records simultaneously and ultimately the multiple window user interface equipment of this invention.

Of importance, the search, index and link feature of the present invention may also be used in non-teaching settings, such as those in which a user simply wishes to search and analyze data. For example, a doctor could choose to search the storage means for all data related to a specific medical diagnostic record. Accordingly, using a search engine, such as Informix's Universal Server, the doctor could retrieve medical diagnostic data and select which data to retain. The selected data information would then be automatically indexed, linked (cross-referenced) and stored by the computer system of the present invention. Additionally, the doctor could also delete, add to or modify the searched data.

PIG. 20 depicts a topic record having fields for storing data related to audio, text, background and search data for consecutive time slots.

DETAILED DESCRIPTION OF PREFERRED EMBODIMENT

Figure 1:
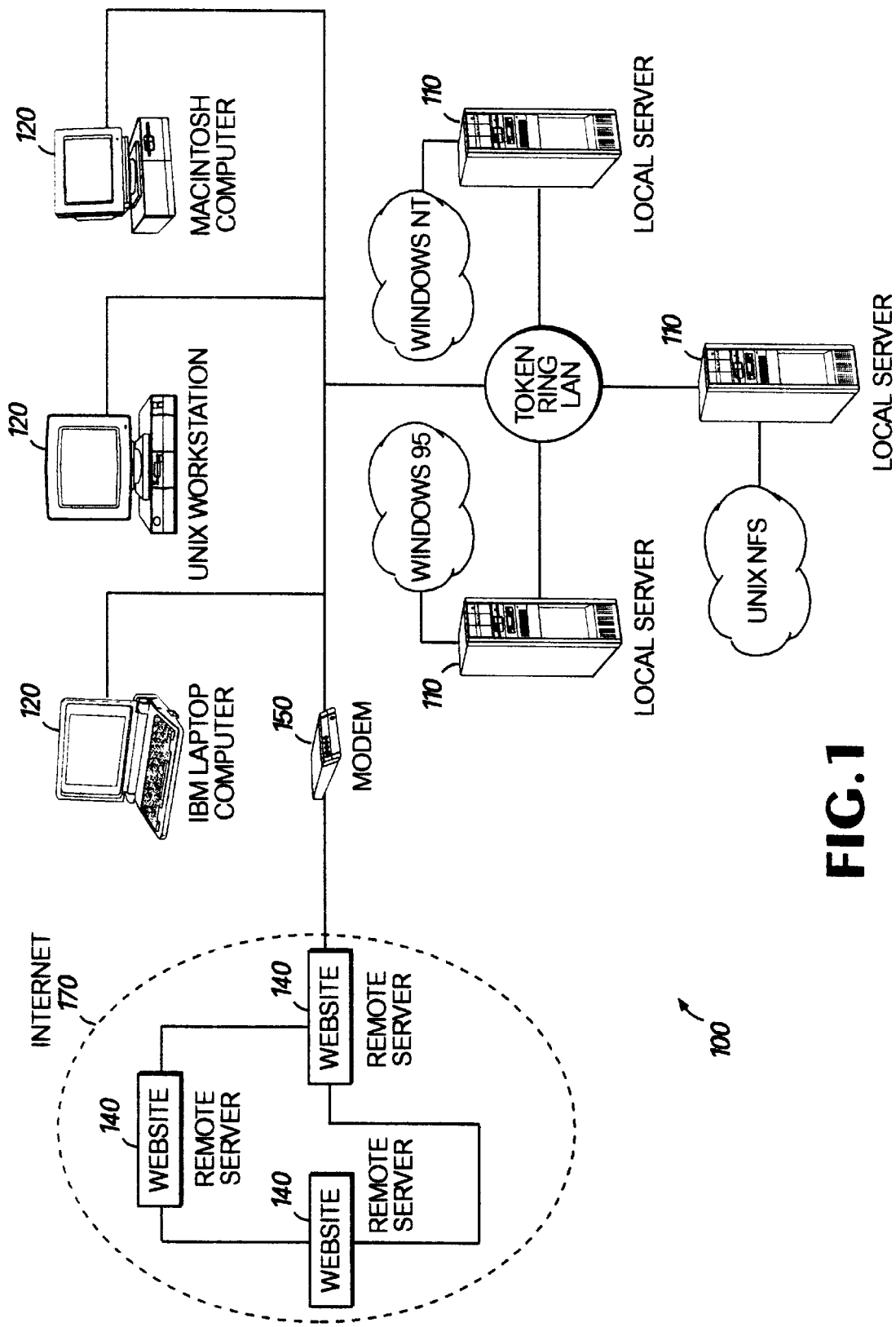
FIG. 1 depicts a diagram of a preferred computer system for implementing the present invention.

The computer system of the present invention may be implemented in a multitude of configurations. As shown in FIG. 1, in a preferred embodiment, the computer system 100 is preferably implemented on a client/server network. The client/server network includes one or more local servers 110 connected to a plurality of clients (workstations) 120 running on a token ring LAN network, an Ethernet WAN or their equivalent.

The local servers 110 may run on Windows 95, Windows NT, Unix or related operating systems. Additionally, the workstations 120 may be IBM compatible computers running on Windows 95, Windows NT or equivalent operating systems, Unix Workstations running on Unix operating systems, Macintosh computers running on MacIntosh operating systems or their equivalent.

The client/server network is also be preferably connected to the Internet 170 through a Hayes compatible modem 150. The Internet 170 typically consists of interconnected remote servers 140 which store and display websites, also known as home pages.

The application programs for the computer system of the present invention are stored on the local servers 110 and/or work stations 120. Additionally, the application programs are coded using Sun's Java programming language or other cross platform development language which is Internet compliant. Accordingly, the application programs allow the local servers 110 and client workstations 120 to communicate with the remote servers 140 using the Internet's Transmission Control Protocol/Internet Protocol (TCP/IP), which provides a means for identifying each remote server 140 and its particular Website (Home Page), and the File Transfer Protocol (FTP), which provides a means for transferring data from the remote servers (Websites) 140 to the local servers client 110 and client workstations 120.

Figure 2:
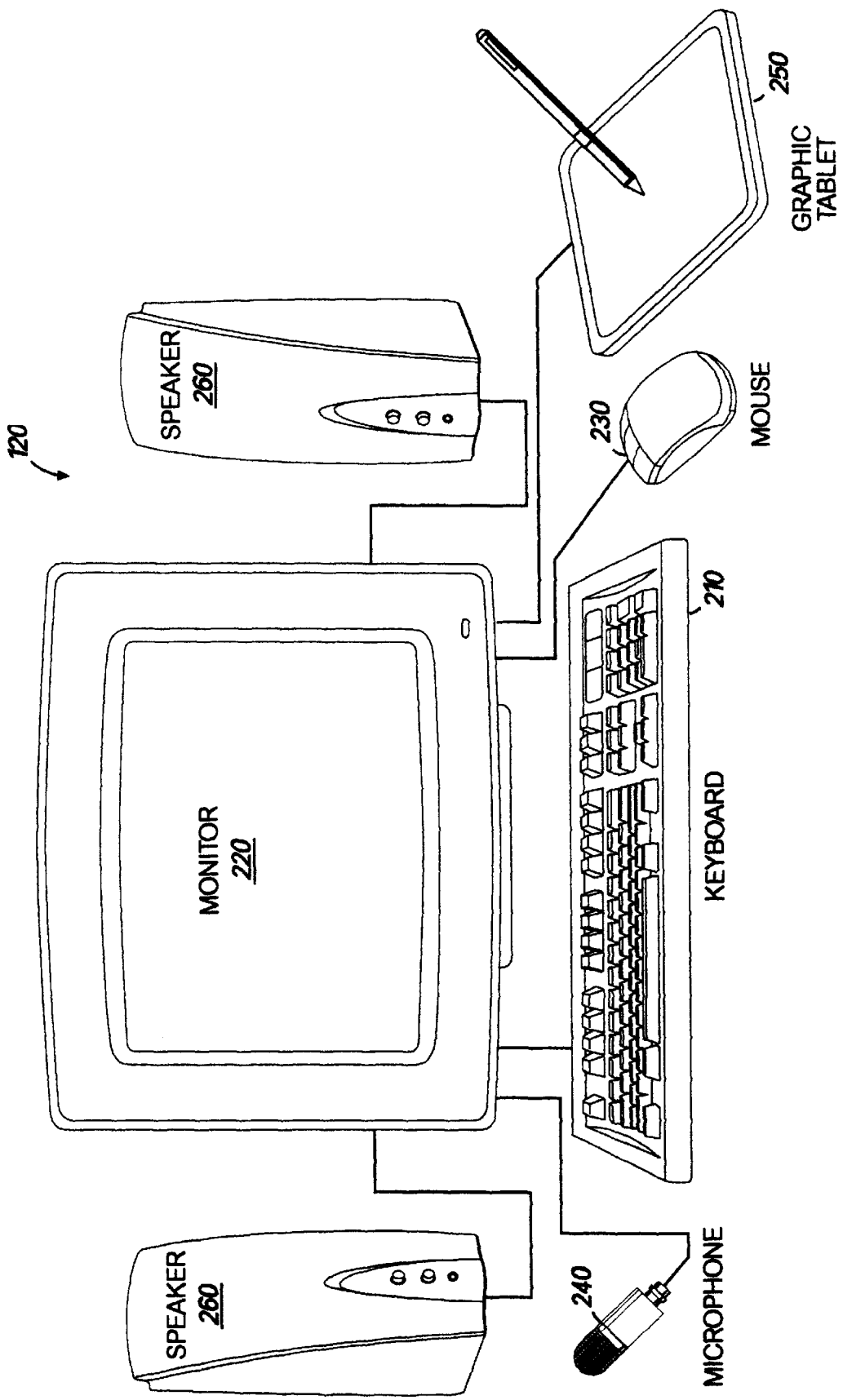
FIG. 2 depicts the external components of a workstation for the computer system of FIG. 1 for implementing the present invention.
Figure 3:
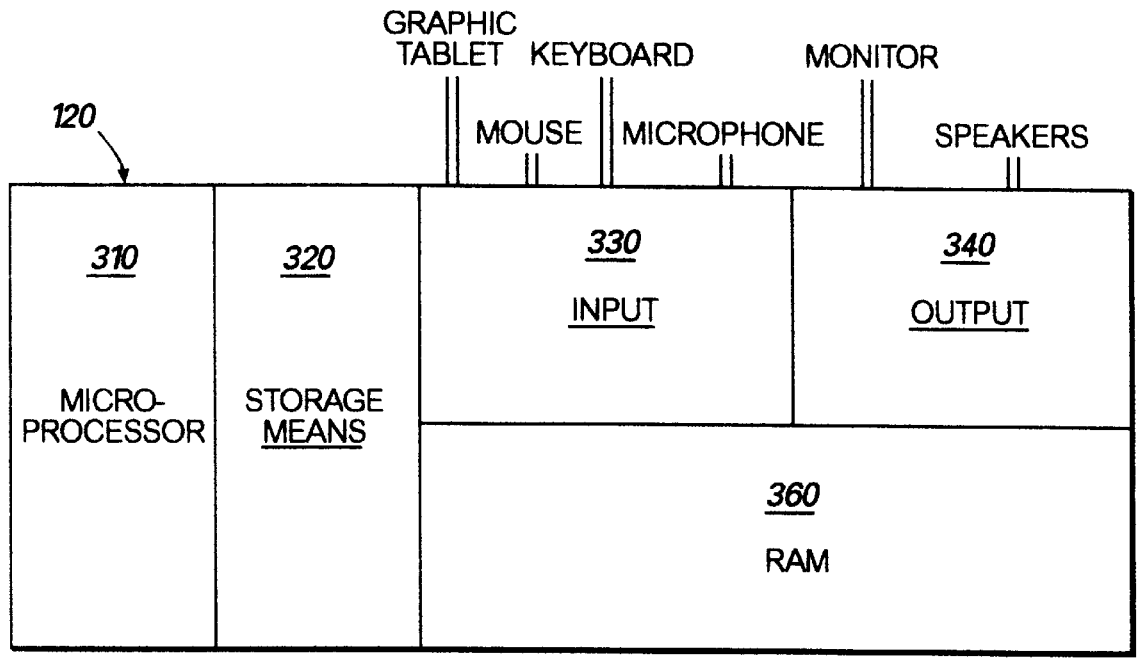
FIG. 3 depicts the internal components of the workstation in FIG. 2.

As shown in FIG. 2, the external components of a workstation 120 include a computer display (e.g., monitor) 220, keyboard 210, a pair of speakers 260, a microphone 240, a mouse 230 and a graphic tablet or plasma tablet 250. As shown in FIG. 3, the internal components of a workstation 120 include a 66 MHz microprocessor 310 for implementing the steps of the application programs; a storage means 320, such as a 100 Gigabyte hard disk drive, a tape drive, floppy disk drive and a CD-Rom drive; an input connection 330 for connecting the graphic tablets 250, mouse 230, keyboard 210 and microphone 240; an output connection 340 for connecting to the monitor 220 and speakers 260; and 32 megabytes of RAM 360. The internal components of the local servers 110 and remote servers 140 preferably include the same components as the workstations 120, except for the input and output connections. However, both also include input and output connections (not shown) for connecting to the client/server network.

The following flow charts depict the operation of the present invention. In a preferred embodiment, using the workstation 120, an instructor initiates the Input Module of Step 1700 to input instructional data. The microprocessor 310 then proceeds to step 1710, where the instructor is prompted with a display on the monitor 220 to input a topical outline. The microprocessor 310 then proceeds to step 1715 to determine whether or not the outline has been received. If not, then the microprocessor 310 proceeds back to step 1710 to prompt the instructor to input the topical outline and continues in this loop until the topical outline is received.

Figure 4:
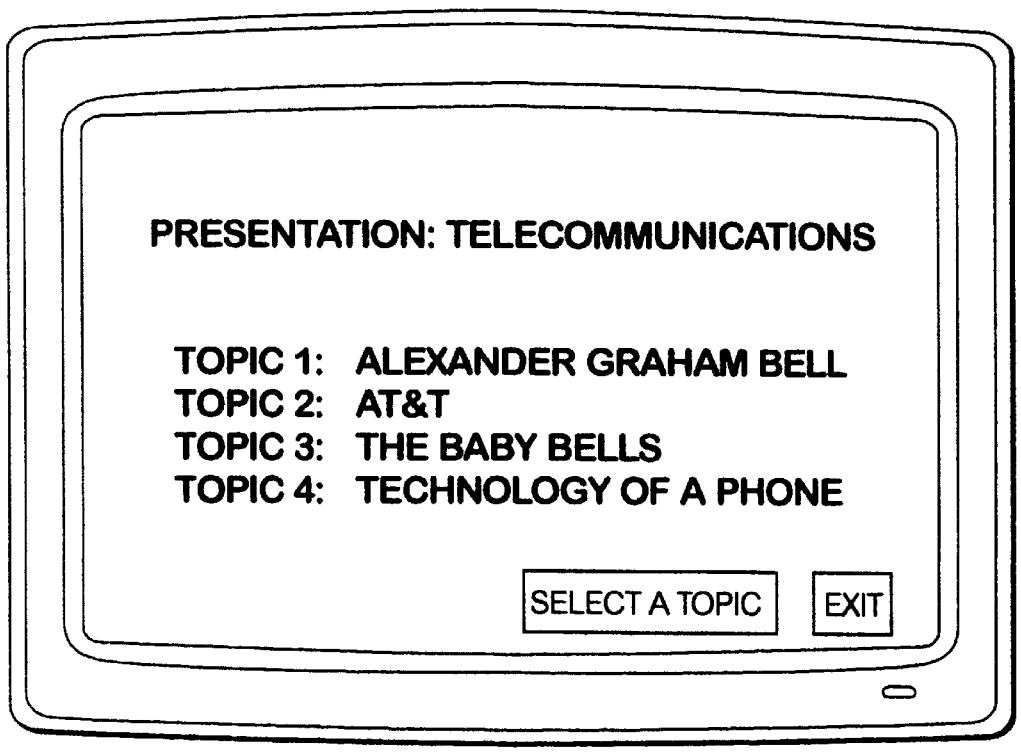
FIG. 4 depicts a computer screen displaying a topical outline which has been input by a user.

Once the topical outline is received, then the microprocessor 310 proceeds to step 1720 where the topical outline is displayed, as shown in PIG. 4. The present invention then proceeds to step 1725, where the instructor is prompted to select a topic from the outline, as shown in FIG. 4. The microprocessor 310 then proceeds to step 1726, where the microprocessor 310 determines whether or not a topic has been selected by the user. If a topic has not been selected, then the microprocessor 310 proceeds to step 1798, where the microprocessor 310 determines whether the "exit" command is selected. If the "exit" command is selected, then the Input Module is ended. However, if the "exit" command is selected, then the microprocessor 310 returns to step 1725 and continues to prompt the instructor to select a topic.

On the other hand, if a topic is selected at step 1726, then the microprocessor 310 proceeds to step 1730, where a topic record 2000, as shown in FIG. 20 is created and temporarily stored in the storage means 320 of the workstation 120 or the local server 110. The topic record 2000 includes, a time slot field, an audio data field, a text data field, a background data field and a search data field.

Figure 5:
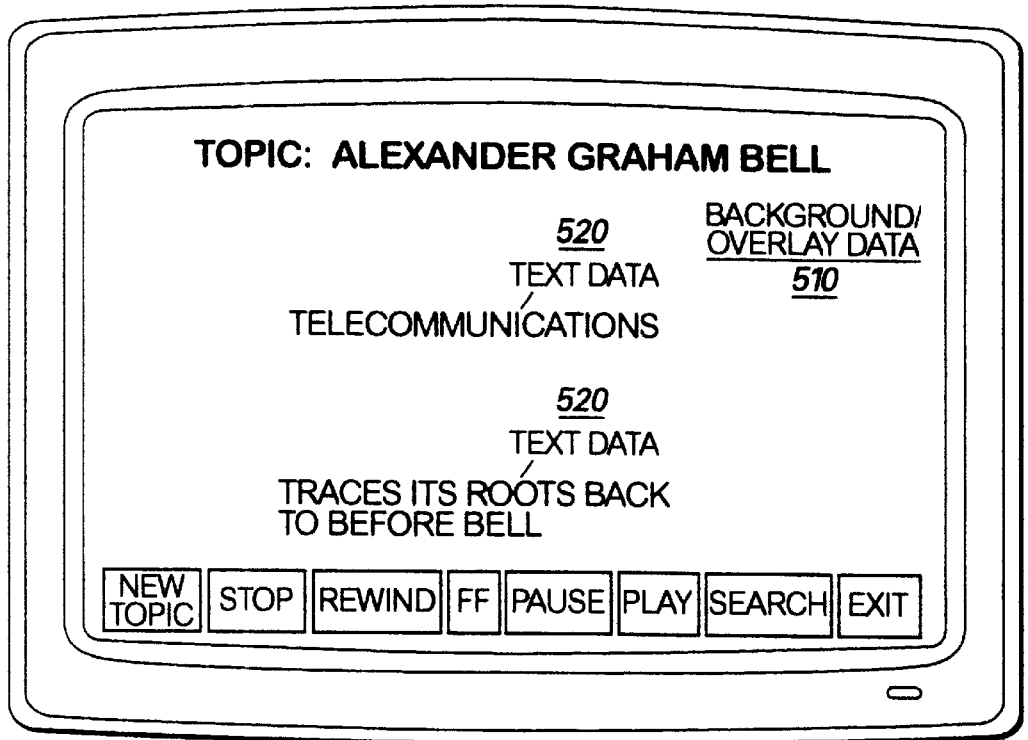
FIG. 5 depicts a computer screen used to allow a user to input and edit audio, text and background data for a topic.

As shown in FIG. 5, the microprocessor 310 then proceeds to step 1735, where the topic selected is displayed at the top of the monitor 220. The microprocessor 310 then proceeds to step 1740 to determine whether any command data has been received. Command data includes "new topic", "stop", "rewind", "fast forward", "pause", "play", "record", "search" and "exit." If no command data is received, then the microprocessor 310 returns to step 1135, where the microprocessor 310 continues to display the topic selected and continues in the loop until command data is received at step 1740.

The microprocessor 310 then proceeds to step 1790 to determine if the command data is equal to "record." If yes, then the microprocessor 310 proceeds to step 1745 where the microprocessor 310 then waits to receive instructional data from the instructor. The instructor may input instructional data that includes background data 510 for the monitor 220, which may be an overlay, vector lines, or bit map entered through the graphic tablet 250; text data 520, such as the word "telecommunications" or the words "traces its roots back to before Bell" using the graphic tablet 250 or the keyboard 210; and audio data 530, such as the instructor's voice, using the microphone 240. Other instructional data, such as image, chart, CAD, numeric and diagnostic data, may also be input by the user using relevant equipment. At step 1745, the microprocessor 310 stores the instructional data and its associated time slot in the RAM 360 of the workstation 120 or local server 110.

The microprocessor 310 then proceeds to step 1750 to determine whether any command data has been received. If no command is received, then the microprocessor 310 returns to step 1745, where the microprocessor 310 continues to store the instructional data as it is input with its associated time slot into the RAM 360 and continues in the loop until command data is received at step 1750.

However, if command data is received at step 1750, then the microprocessor 310 proceeds to step 1753 to determine if the command data is equal to "stop". If yes, then the microprocessor 310 proceeds to step 1754, where the current topic is displayed on the monitor 220. The microprocessor 310 then proceeds to step 1755 to determine if any further command data is received. If not, then the microprocessor 310 returns to step 1754, where the current topic continues to be displayed on the monitor and the microprocessor 310 continues in this loop until command data is received.

Returning back to step 1753, if the command data does not equal "stop," then the microprocessor 310 proceeds to step 1756, where the microprocessor 310 determines whether the command data is equal to "pause." If the command data is equal to pause, then the microprocessor 310 proceeds to step 1757, where the instructional data for the current time slot is displayed. The microprocessor 310 then proceeds to step 1758, where it determines whether command data is received. If not, then the microprocessor 310 returns to step 1757, where the instructional data for the current time slot continues to be displayed and the microprocessor 310 continues in this loop until command data is received.

Returning to step 1756, if the command data does not equal "pause," then the microprocessor 310 proceeds to step 1760, where the microprocessor 310 determines whether the command data is equal to "play." If the command data is equal "play," then the microprocessor 310 proceeds to step 1761, where the microprocessor 310 displays instructional data on the monitor 220 starting with the instructional data for the current time slot and proceeding with the future time slots in consecutive order. The microprocessor 310 then proceeds to step 1762, where the microprocessor 310 determines whether command data is received. If not, then the microprocessor 310 returns to step 1761, where the instructional data continues to be displayed for the consecutive time slots and continues in this loop until command data is received.

Returning back to step 1760, if the command data does not equal "play," then the microprocessor 310 proceeds to step 1765, where the microprocessor 310 determines whether the command data equals "fast forward." If the command data is equal to "fast forward," then the microprocessor 310 proceeds to step 1766 where the microprocessor 310 quickly displays on the monitor 220 the instructional data for the current time slot and future time slots in consecutive order. The microprocessor 310 then proceeds to step 1767, where the microprocessor 310 determines whether command data is received. If not, then the microprocessor 310 returns to step 1766 and continues to quickly display the instructional data to the consecutive time slots and continues in the loop until command data is received.

Returning to step 1765, if the command data does not equal "fast forward," then the microprocessor 310 proceeds to step 1770, where the microprocessor 310 determines whether the command data equals "rewind." If the command data is equal to "rewind," then the microprocessor 310 proceeds to step 1771, where the instructional data at a current time slot and all past time slots is displayed on the monitor 220 in reverse consecutive order. The microprocessor 310 proceeds to step 1772 to determine whether command data is received. If command data is not received, then the microprocessor 310 returns to step 1771 and continues to display the instructional data for past time slots in reverse consecutive order and continues in this loop until command data is received.

Returning back to steps 1755, 1758, 1762, 1767 and 1772, if command data is received, then the microprocessor 310 proceeds to step 1790, where the microprocessor 310 determines whether the command data equals "record." If not, then the microprocessor 310 returns to step 1753 and continues through the "pause," "play," "fast forward" and "rewind" loop just discussed above. However, if the command data equals "record," then the microprocessor 310 returns to step 1745, where the instructor is able to pick up at the current time slot, continue to input instructional data for a particular topic into the next time slot in consecutive order, have the instructional data stored in the RAM 360 and generally continue to input the presentation data as described above.

Returning back to step 1770, if the command data does not equal "rewind," then the microprocessor 310 proceeds to step 1775 and determines whether the command data is equal to "search." If the command data equals "search", then the microprocessor 310 proceeds to step 1780, where the Search Module is run.

Figure 6:
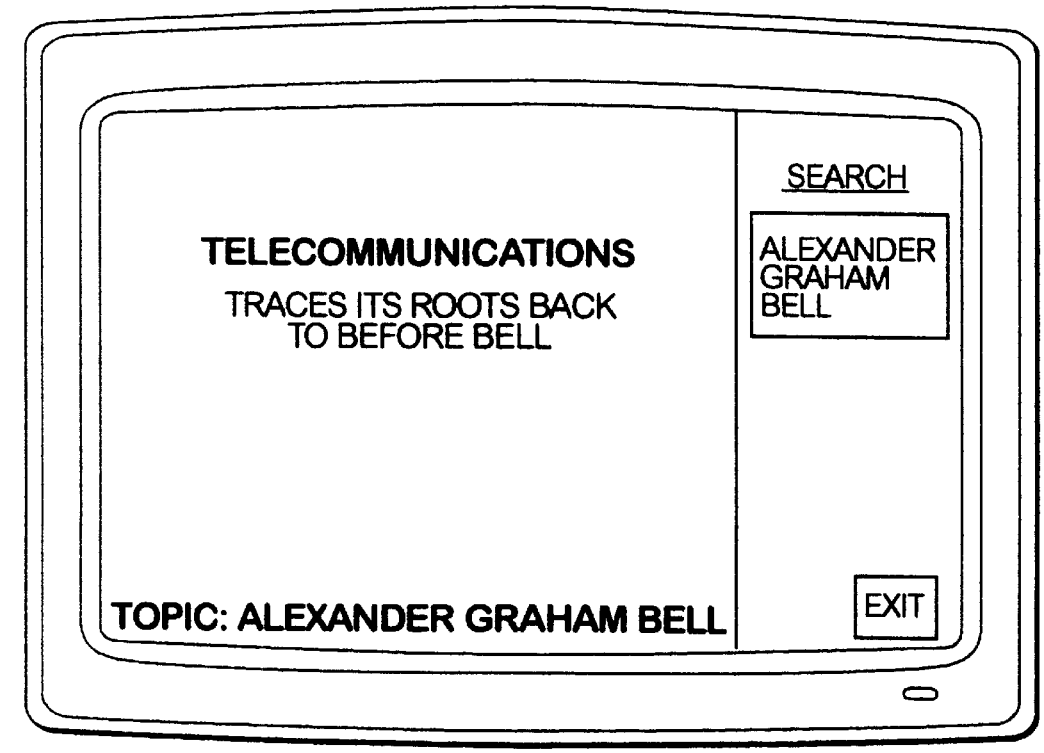
FIG. 6 depicts a computer screen allowing a user to search storage means in the computer system for data related to a segment of the selected topic of FIG. 5.
Figure 18:
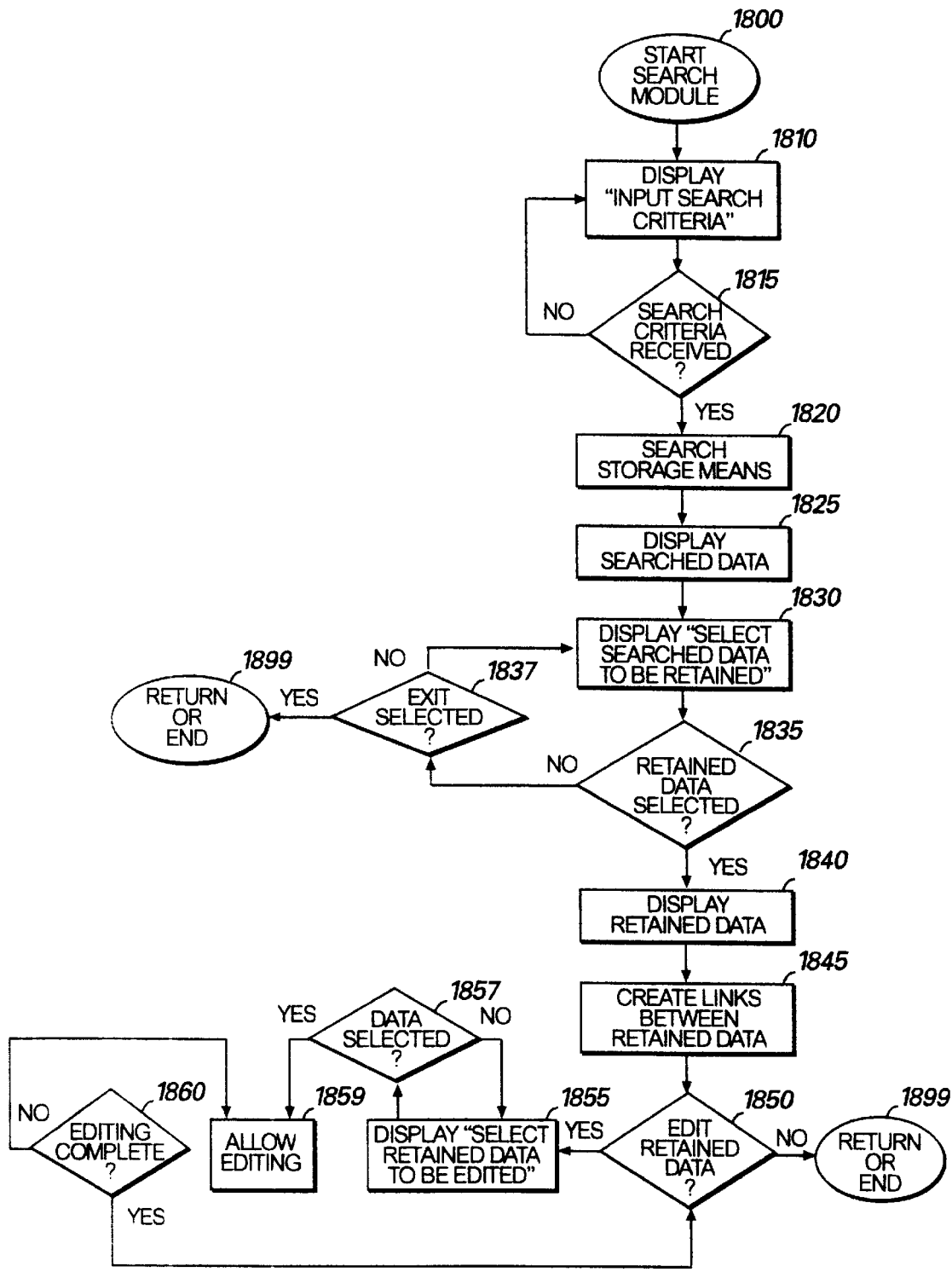
FIG. 18 depicts a flow diagram of the preferred embodiment for the Search Module of the present invention.

As shown in FIG. 18, at step 1800, the Search Module is started. The microprocessor 310 then proceeds to step 1810, where the user is prompted to input search criteria on the right side of the monitor 220 with a blank box, as shown in FIG. 6. For this example, "Alexander Graham Bell" has been selected.

The microprocessor 310 then proceeds to step 1815 to determine whether search criteria has been received. If no search criteria has been received, then the microprocessor 310 returns to step 1810 and continues to prompt the user to input the search criteria. However, at step 1815 if search criteria has been received, then the microprocessor 310 proceeds to step 1820, where the microprocessor 310 uses a search engine, such as Illustra's Server, Netscape Microsoft's Explorer, Digital Equipment's Alta Vista, Yahoo or Lyco to search various storage means 120 in the computer system.

As described above, the storage means may include local storage means, such as CD ROMs and hard drives located on the workstations 120 and/or local servers 110, and may also include Websites located on remoter servers 140 in the Internet 170. Most search engines, such as Netscape, Explorer, Alta Vista and Yahoo, can only currently retrieve text data. Additionally, Lyco is used to retrieve only audio and image data. However, Informix's Universal Server (formerly Illustra) is capable of retrieving text, audio, image and database type data. Other searches engine capable of searching numeric, diagnostic and CAD type data may also be used.

Figure 7:
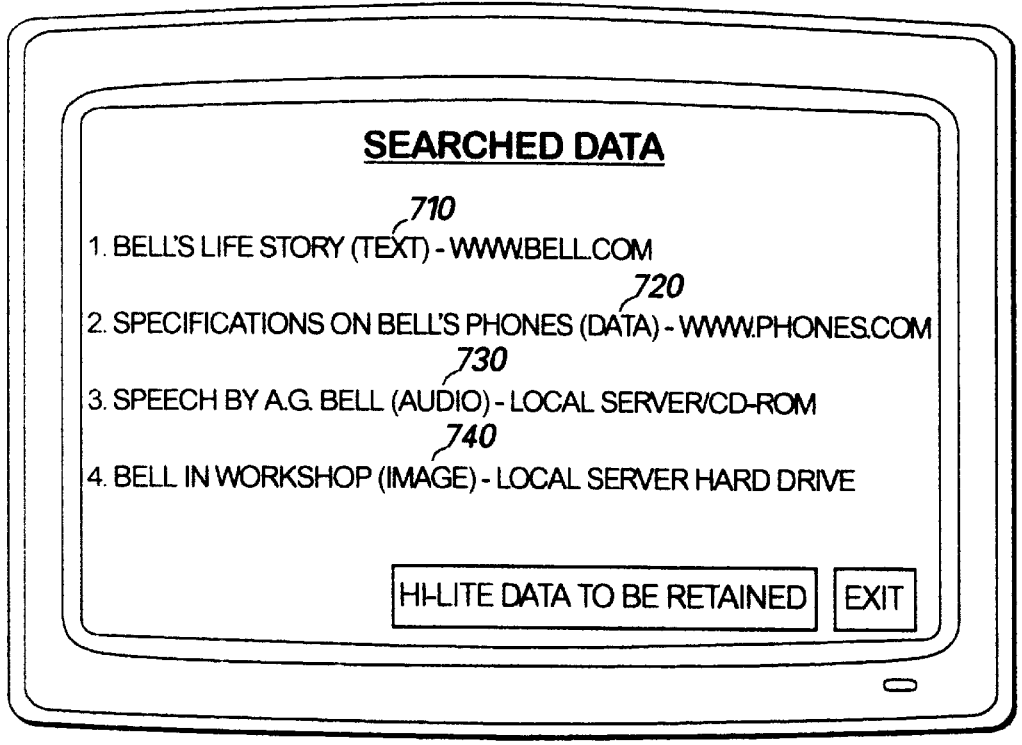
FIG. 7 depicts a computer screen displaying search data captured based on the search in FIG. 6.

As shown in FIG. 7 (assuming Informix's Universal Server is used), the microprocessor 310 then proceeds to step 1825, where the text, audio, image and database data retrieved during the search is displayed. The microprocessor 310 then proceeds to step 1830, where the user is prompted to select the search data to be retained.

The microprocessor 3 10 then proceeds to step 1835, where the microprocessor 310 determines whether retained data has been selected. If no retained data has been selected, then the microprocessor 310 proceeds to step 1837, where it determines whether the command data equal to "exit" has been selected. If yes, then the microprocessor 310 proceeds to step 1899, where the microprocessor 310 returns to the Internet Module. However, if no, then the microprocessor 310 proceeds back to step 1830, where the searched data continues to be displayed and the user continues to be prompted to select the search data to be retained or exit the screen. The microprocessor 3 10 continues in this loop until the user selects data to be retained or selects the "exit" command data.

Figure 8:
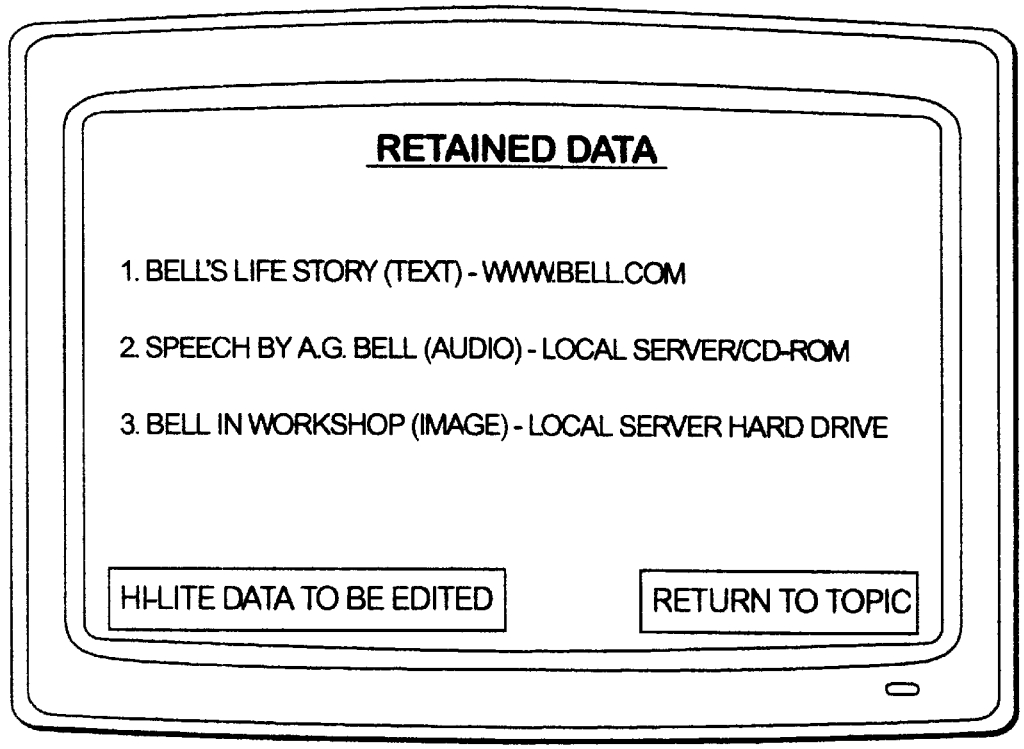
FIG. 8 depicts a computer screen displaying the search data of FIG. 7 retained by a user of the computer system.

Returning to step 1835, if searched data is selected to be retained, then the microprocessor 310 proceeds to step 1840, where the retained data is displayed, as shown in FIG. 8. The microprocessor 310 then proceeds to step 1845, where it automatically creates links (cross references) between the retained data.

As shown in FIG. 8, the microprocessor 310 then proceeds to step 1850, where the microprocessor 310 allows the user to select to edit the retained data or return to observing the topic presentation. The microprocessor 310 then proceeds to step 1850, where the microprocessor 310 determines whether the user has decided to edit any of the retained data or simply return to the topic screen. If the user has selected to edit the retained data, then the microprocessor 310 proceeds to step 1855, where the user is prompted to select the retained data to be edited. The microprocessor 310 then proceeds to step 1857 to determine whether retained data to be edited has been selected. If not, then the microprocessor 310 returns to step 1855 and continues in this loop until retained data is selected or the exit command is selected.

If retained data is selected for editing, then the microprocessor 310 proceeds to step 1859 to allow editing (not shown). Editing can be accomplished using off the shelf applications programs, such as Microsoft's Word or WordPerfect for text data or Microsoft's Access for database data.

The microprocessor 310 then proceeds to step 1860 to determine if the editing is complete. The microprocessor 310 remains in this loop until the editing is complete, at which time the microprocessor 310 returns to step 1850 and prompts the user to either select additional retained data for editing or to exit back to the topic presentation. If the "exit" command is selected, then the microprocessor 310 proceeds to step 1899, where the microprocessor 310 returns to the Input Module at step 1780. The microprocessor 310 then proceeds to step 1735 to allow additional instruction data for the topic to be input and/or edited by the user.

Returning back to step 1775, if the command data is not equal to "search," then the microprocessor 310 proceeds to step 1785 to determine if the command data is equal to "exit." If yes, then the microprocessor 310 proceeds to step 1799 where the Input Module ends. However, if the command data does not equal "exit," then the microprocessor 310 knows that the command data is equal to "new topic" (see FIG. 5). The microprocessor 310 then proceeds to step 1788, where the microprocessor 310 stores the instructional data for the topic record on the storage means 320 of the workstation 120 or local server 110. The microprocessor then proceeds to 1720, where the outline is displayed (see FIG. 4) and the instructor is able to select another topic for inputting instructional data.

Figure 9:
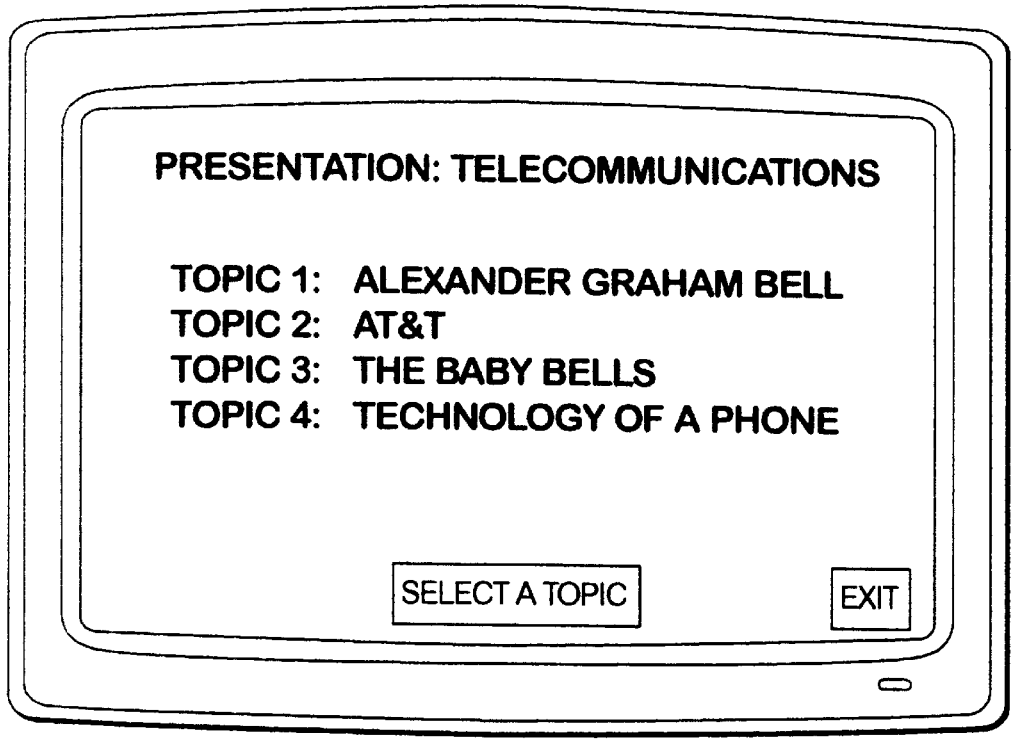
FIG. 9 depicts a computer screen displaying a topical outline from which a user may select a topic to be presented.
Figure 19A:
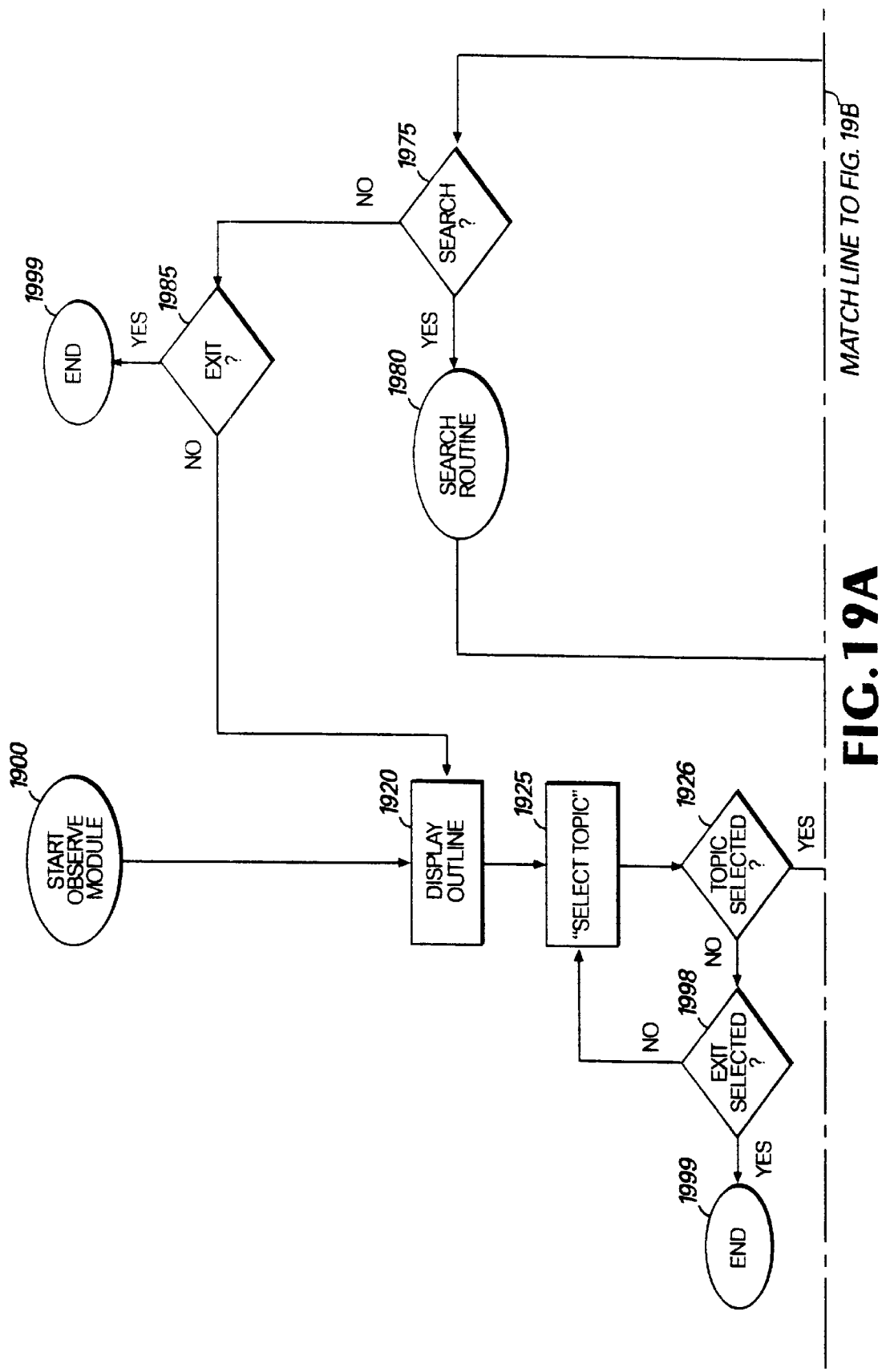
FIG. 19 depicts a flow diagram of a preferred embodiment of the Observe Module of the present invention.
Figure 19B:
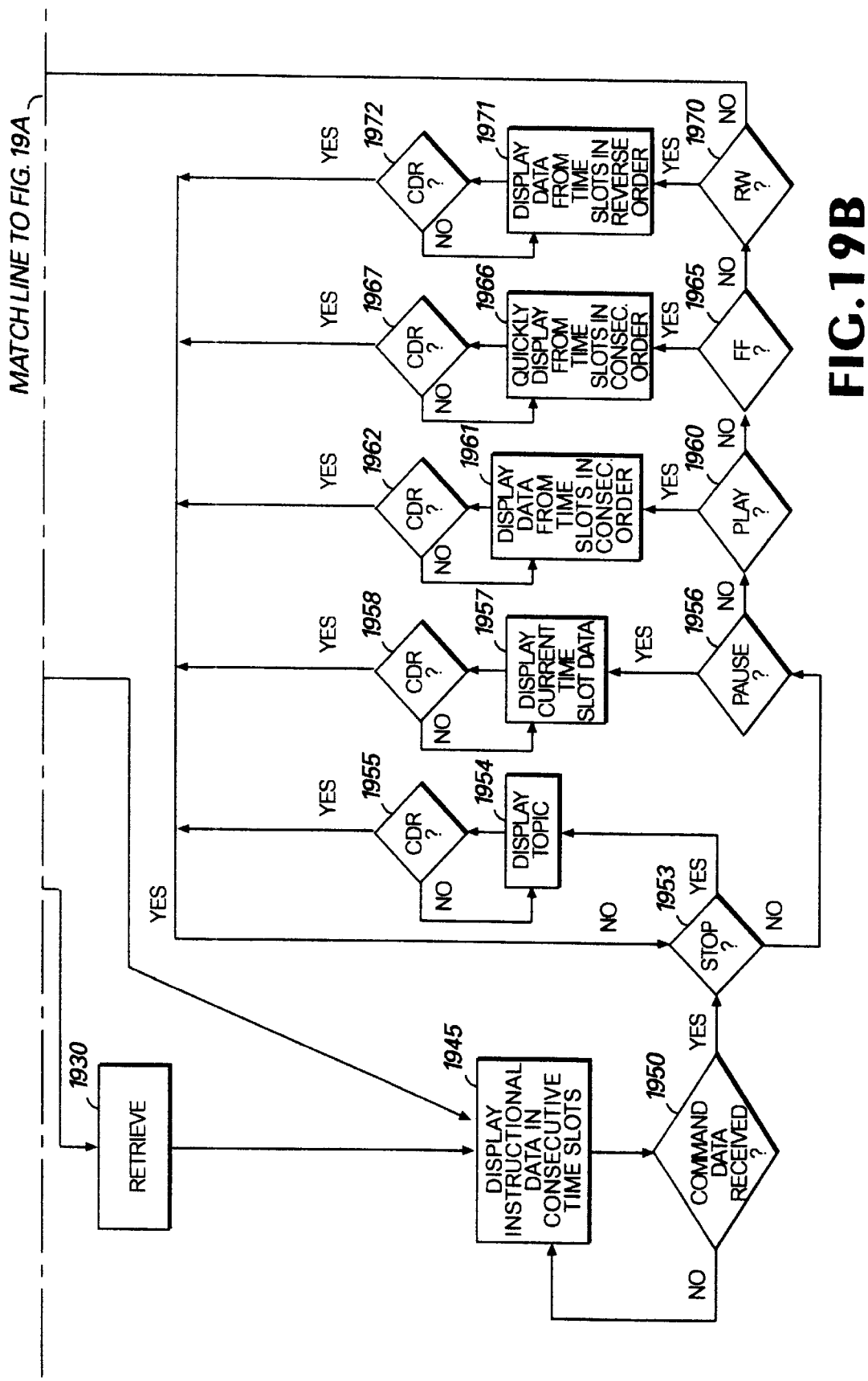

Referring to FIG. 19, a student may now observe the presentation recorded by the instructor. At step 1900, the Observe Module is initiated by the student. As shown in FIG. 9, the microprocessor 310 then proceeds to step 1920, where the topic outline is displayed. The microprocessor 310 then proceeds to step 1925, where the student is prompted to select a topic.

The microprocessor 310 then proceeds to step 1926 to determine whether a topic has been selected. If not, then the microprocessor 310 proceeds to step 1998 to determine whether the "exit" command data is selected. If yes, then the microprocessor 310 proceeds to step 1999, where this Observe Module is ended. However, if no, then the microprocessor 310 proceeds to step 1925 and remains in this loop until a topic is selected.

Figure 10:
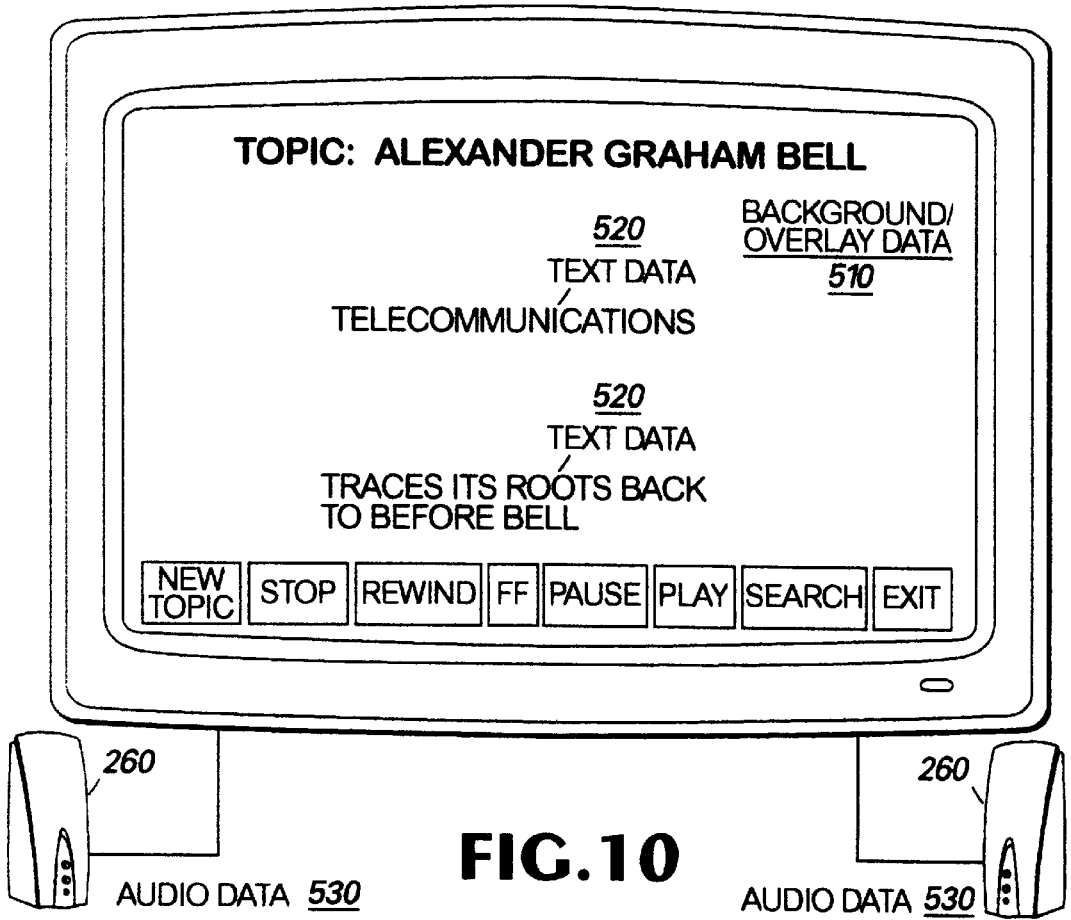
FIG. 10 depicts a computer screen for a user to observe a presentation on the topic selected in FIG. 9.

After a topic is selected, the microprocessor 310 proceeds to step 1930, where the topic record for the selected topic is retrieved from the storage means 320 of the workstation 120 or local server 110. As shown in FIG. 10, the microprocessor 310 then proceeds to step 1945, where the instructional data for the topic is displayed in consecutive time slot order. The microprocessor 310 then proceeds to step 1950 to determine whether command data has been received. If not, then the microprocessor 310 returns to step 1940 and remains in this loop displaying the instructional data in consecutive order by time slot until command data is received.

When command data is received, the microprocessor 310 proceeds to step 1953. If the command data equals "stop," then the microprocessor 310 proceeds to step 1954, where the current topic is displayed on the monitor 220. The microprocessor 310 then proceeds to step 1955 to determine if any further command data is received. If not, then the microprocessor 310 returns to step 1954, where the current topic continues to be displayed on the monitor and the microprocessor 310 continues in this loop until command data is received.

Returning back to step 1953, if the command data does not equal "stop," then the microprocessor 310 proceeds to step 1956, where the microprocessor 310 determines whether the command data is equal to "pause." If the command data is equal to pause, then the microprocessor 310 proceeds to step 1957, where the instructional data for the current time slot is displayed. The microprocessor 310 then proceeds to step 1958, where it determines whether command data has been received. If not, then the microprocessor 310 returns to step 1957, where the instructional data for the current time slot continues to be displayed and continues in this loop until command data is received.

Returning to step 1956, if the command data does not equal "pause," then the microprocessor 310 proceeds to step 1960, where the microprocessor 310 determines whether the command data is equal to "play." If the command data equals "play," then the microprocessor 310 proceeds to step 1961, where the microprocessor 310 displays instructional data on the monitor 220 starting with the instructional data for the current time slot and proceeding with the future time slots in consecutive order. The microprocessor 310 then proceeds to step 1962, where the microprocessor 310 determines whether command data is received. If not, then the microprocessor 310 returns to step 1961, where the instructional data continues to be displayed for the consecutive time slots and the microprocessor 310 continues in this loop until command data is received.

Returning back to step 1960, if the command data does not equal "play," then the microprocessor 310 proceeds to step 1965, where the microprocessor 310 determines whether the command data equals "fast forward." If the command data is equal to "fast forward," then the microprocessor 310 proceeds to step 1966, where the microprocessor 310 quickly displays on the monitor 220 the instructional data for the current time slot and future time slots in consecutive order. The microprocessor 310 then proceeds to step 1967, where the microprocessor 310 determines whether command data is received. If not, then the microprocessor 310 returns to step 1966 and continues to quickly display the instructional data for the consecutive time slots and continues in the loop until command data is received.

Returning to step 1965, if the command data does not equal "fast forward," then the microprocessor 310 proceeds to step 1970, where the microprocessor 310 determines whether the command data equals "rewind." If the command data is equal to "rewind," then the microprocessor 310 proceeds to step 1971, where the instructional data at a current time slot and all past time slots is displayed on the monitor 220 in reverse consecutive order. The microprocessor 310 then proceeds to step 1972 to determine whether command data is received. If command data is not received, then the microprocessor 310 returns to step 1971 and continues to display the instructional data for past time slots in reverse consecutive order and continues in this loop until command data is received.

Returning back to steps 1955, 1958, 1962, 1967 and 1972, if command data is received, then the microprocessor 310 proceeds to step 1953, where the microprocessor 310 continues through the "pause," "play," "fast forward" and "rewind" loop just discussed above.

Figure 11:
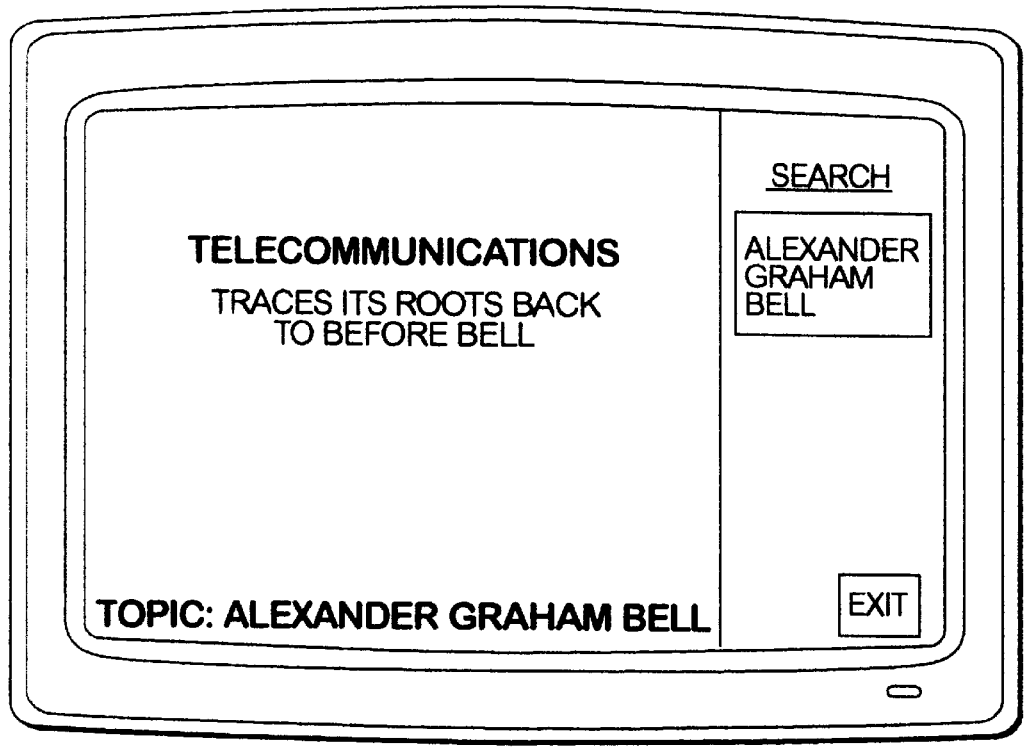
FIG. 11 depicts a computer screen allowing a user to search storage means in the computer system for data related to a segment of the topic selected in FIG. 10.
Figure 12:
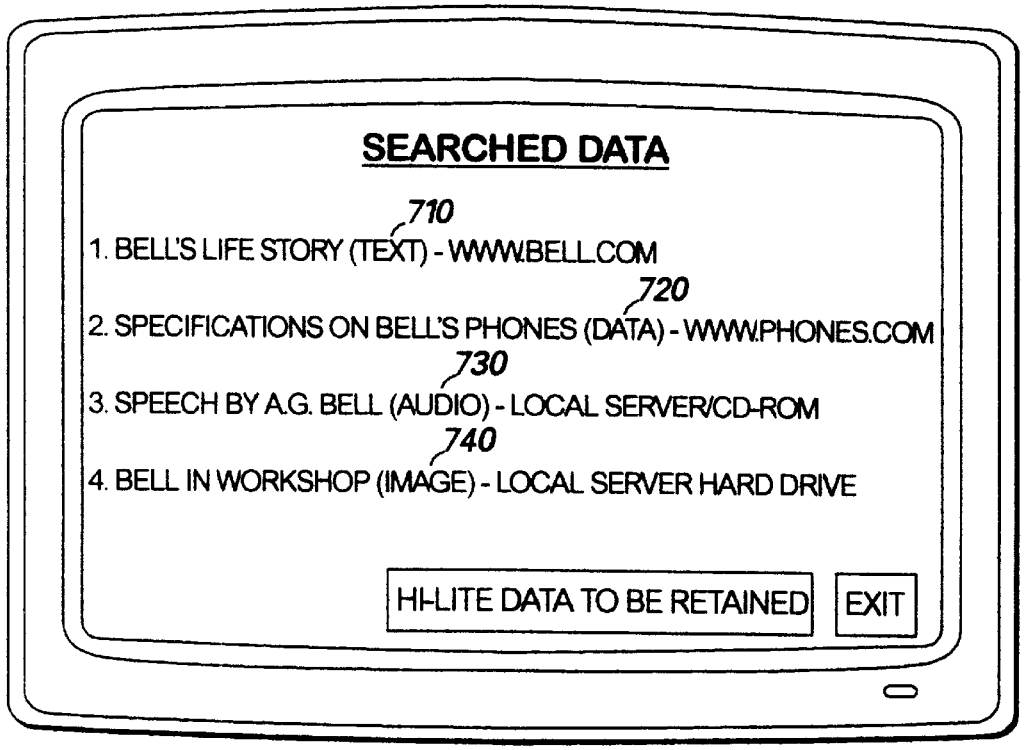
FIG. 12 depicts a computer screen displaying search data captured based on the search in FIG. 11.
Figure 13:
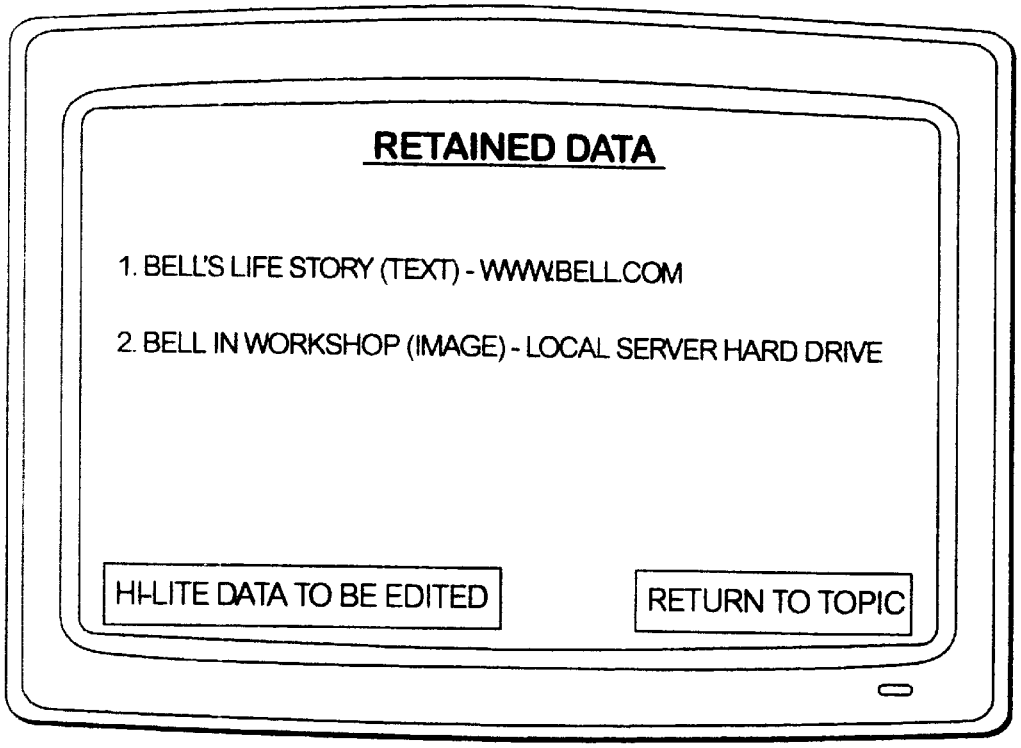
FIG. 13 depicts a computer screen displaying the search data of FIG. 12 retained by a user of the computer system.

Returning back to step 1970, if the command data does not equal "rewind," then the microprocessor 310 proceeds to step 1975 and determines whether the command data equals "search." If the command data does equal "search", then the microprocessor 310 proceeds to step 1980, where the Search Module is run as described above for the Input Module embodiment and as shown in FIGS. 11–13. The microprocessor then returns to step 1945 to allow the student to return to viewing the instructional data.

Returning back to step 1975, if the command data does not equal "search," then the microprocessor 310 proceeds to step 1985 to determine if the command data equals "exit." If yes, then the microprocessor 310 proceeds to step 1999, where the Observe Module ends. However, if the command data does not equal "exit," then the microprocessor 310 knows that the command data is equal to "new topic" and proceeds to step 1920, where the outline is again displayed and the student is allowed to select another topic for observing.

Of importance, in an alternative embodiment of the present invention, the Search Module of FIG. 18 may run as an independent module. Accordingly, a user may simply use this module to search, retrieve, retain, automatically link (cross-reference), store and edit a variety of data from a variety of storage means.

Figure 14:
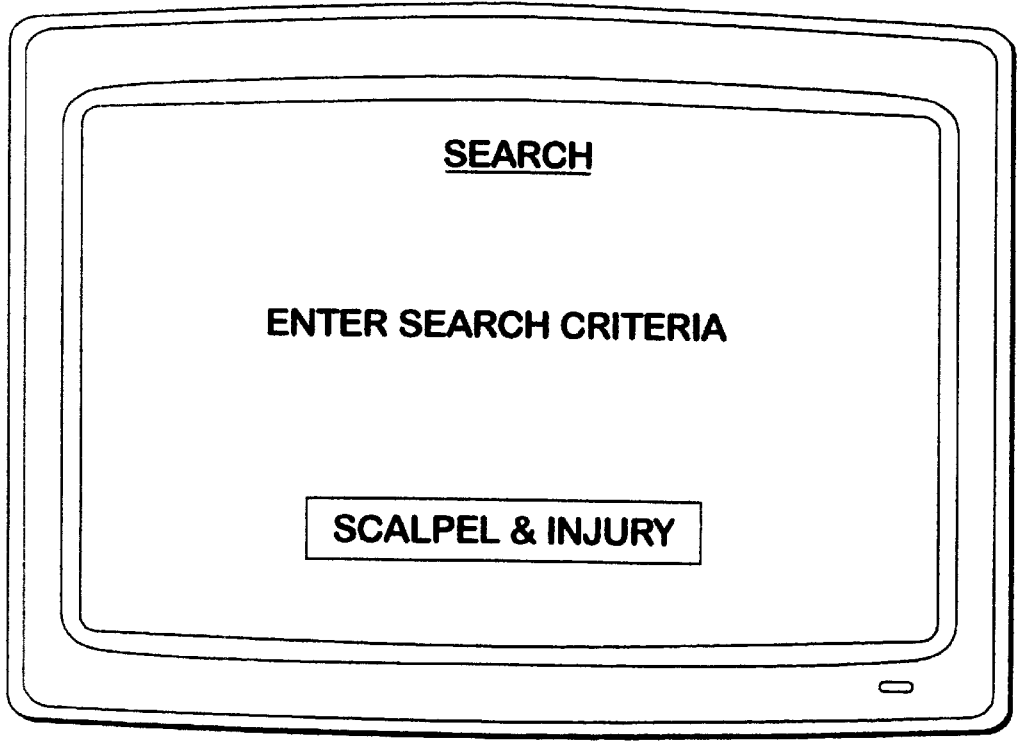
FIG. 14 displays a computer screen for a user not inputting or observing a presentation, but one who simply wants to perform a search of storage means in the computer system for a particular topic.

For this embodiment, at step 1800, the Search Module is started. As shown in FIG. 14, the microprocessor 310 then proceeds to step 1810, where the user is prompted to input search criteria. The microprocessor 310 then proceeds to step 1815 to determine whether search criteria has been received. If no search criteria has been received, then the microprocessor 310 returns to step 1810 and continues to prompt the user to input the search criteria. However, at step 1815 if search criteria has been received, then the microprocessor 310 proceeds to step 1820, where the microprocessor 310 uses one of the search engines described above to search all storage means in the computer system. For this example, "Scalpel and Injury" have been selected as the search criteria.

Figure 15:
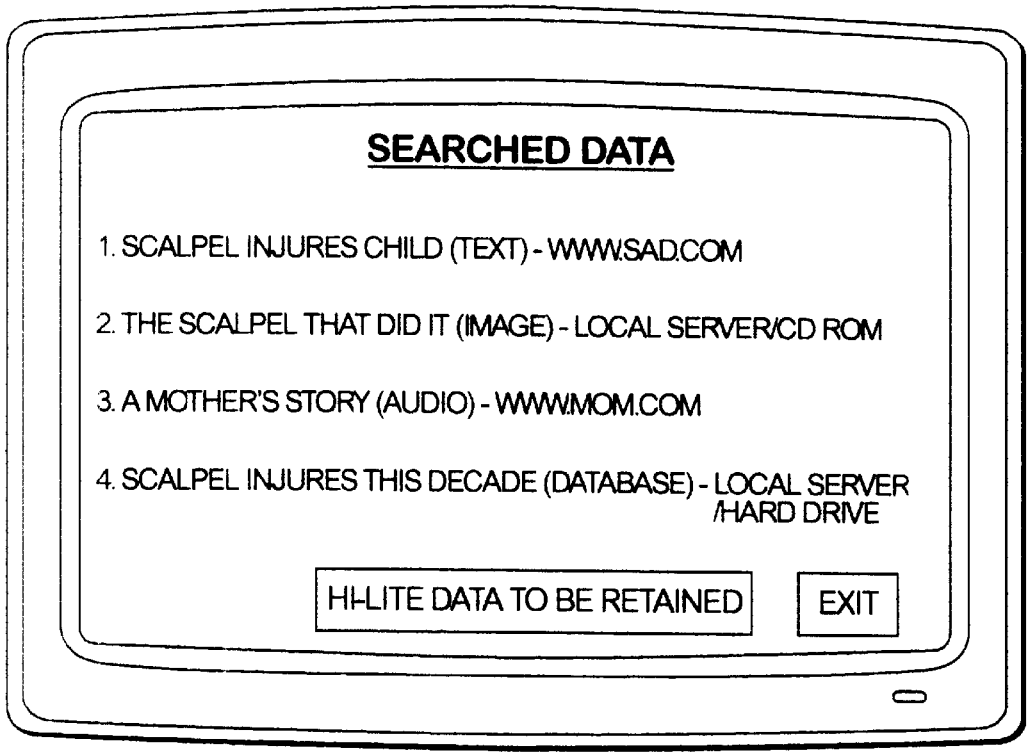
FIG. 15 displays a computer screen displaying search data captured based on the search in FIG. 14.

Again, as described above, the storage means may include local storage means such as CD ROMs and hard drives located on the workstations 120 and/or local servers 110, and also may include websites located on remoter servers 140 in the Internet 170. The microprocessor 310 then proceeds to step 1825, where the data retrieved during the search is displayed, as shown in FIG. 15. The microprocessor 310 then proceeds to step 1830, where the user is prompted to select the search data to be retained.

The microprocessor 310 then proceeds to step 1835, where the microprocessor 310 determines whether retained data has been selected. If no retained data has been selected, then the microprocessor 310 proceeds to step 1837, where it determines whether the command data equal to "exit" has been selected. If yes, then the microprocessor 310 proceeds to step 1899, where the microprocessor 310 exits the Search Module. However, if no, then the microprocessor 310 proceeds back to step 1830, where the searched data continues to be displayed and the user is continuously prompted to select the search data to be retained or exit the screen. The microprocessor 310 continues in this loop until the user selects data to be retained or selects the "exit" command data.

Figure 16:
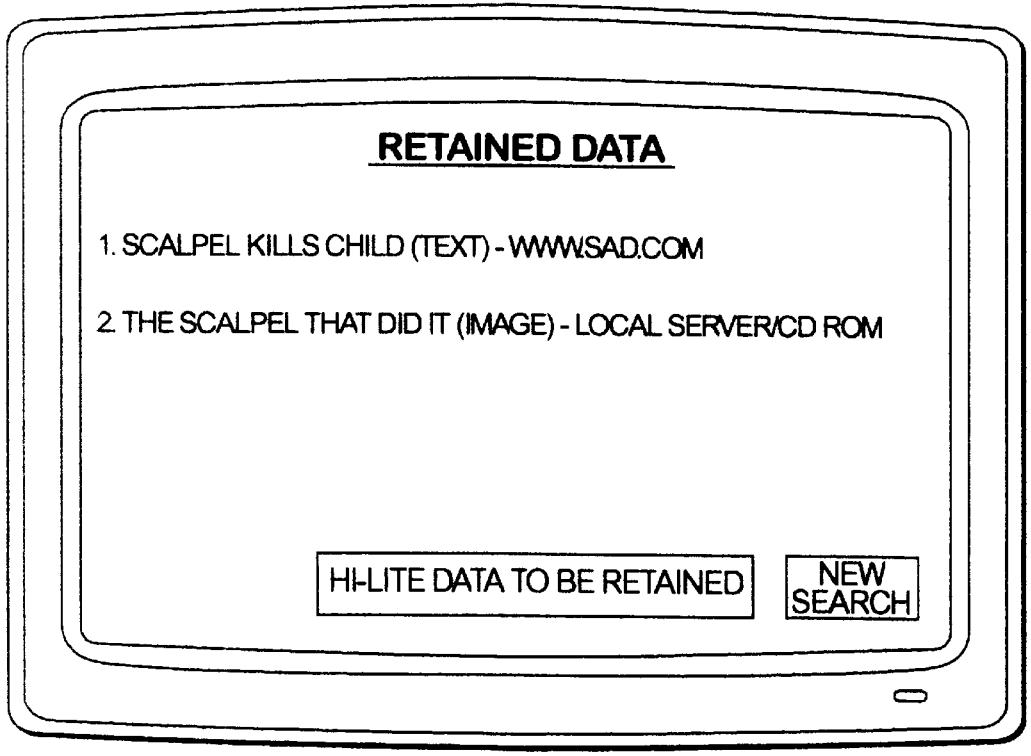
FIG. 16 depicts a computer screen displaying the search data of FIG. 15 retained by a user of the computer system.
Figure 17B:
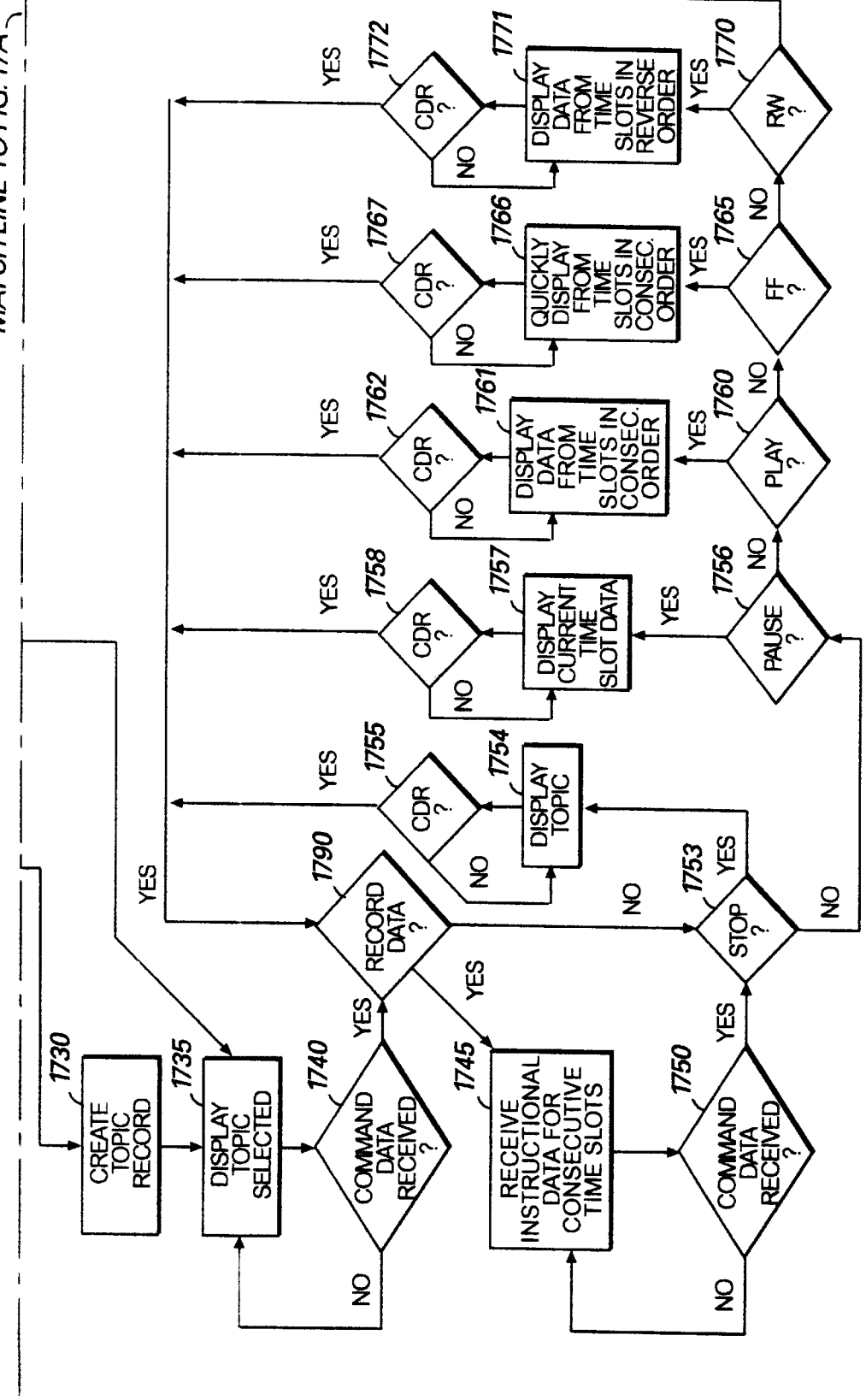
FIG. 17 depicts a flow diagram of a preferred embodiment for the Input Module of the present invention.

Returning to step 1835, if searched data is selected to be retained, then the microprocessor 310 proceeds to step 1840, where the retained data is displayed, as shown in FIG. 16. The microprocessor 310 then proceeds to step 1845, where it automatically creates links (cross references) between the retained data.

As shown in FIG. 16, the microprocessor 310 then proceeds to step 1850, where the microprocessor 310 allows the user to select to edit the retained data or exit the Search Module. If the user has selected to edit the retained data, then the microprocessor 310 proceeds to step 1855, where the user is prompted to select the retained data to be edited. The microprocessor 310 then proceeds to step 1857 to determine whether retained data to be edited has been selected. If not, then the microprocessor 310 returns to step 1855 and continues in this loop until retained data is selected or the exit command is selected. If the retained data is selected for editing, then the microprocessor 310 proceeds to step 1859 to allow editing (not shown). Again, editing may be accomplished with a variety of off the shelf products.

The microprocessor 310 then proceeds to step 1860 to determine if the editing is complete. The microprocessor 310 remains in this loop until the editing is complete, at which time the microprocessor 310 returns to step 1850 and prompts the user to either select additional retained data for editing or to exit the Search Module. If the "exit" command is selected, then the microprocessor 310 proceeds to step 1899, where the microprocessor 310 exits the Search Module.

What has been described above are preferred embodiments of the present invention. It is, of course, not possible to describe every conceivable combination of methodologies for purposes of describing the present invention. However, one of ordinary skill in the art will recognize that any further combinations, permutations and modifications of the present invention are possible. Therefore, all such possible combinations, permutations and modifications are to be included within the scope of the claimed invention, as defined by the claims below.

I claim:

1. A method for managing data on a computer system, said method comprising the steps of:

(a) a first party creating a topic record representative of a topic, wherein the topic record includes a plurality of fields for storing instruction data representative of data from a presentation and retained search data representative of data obtained from a storage means accessible to the computer system, wherein each of the plurality of fields includes a plurality of time slots representative of a plurality of time periods;

(b) prompting the first party to input instruction data for a plurality of consecutive time slots;

(c) for the plurality of consecutive time slots, receiving from the first party the instruction data;

(d) storing on the storage means the topic record and instruction data in its respective field and time slot;

(e) receiving from the first party a request to search for additional data for a particular time slot;

(f) prompting the first party to input a search criteria related to the additional data to be searched;

(g) receiving from the first party criteria data representative of the search criteria;

(h) searching one or more storage means of the computer system for search data associated with the criteria data;

(i) displaying the search data to the first party;

(j) prompting the first party to select the search data to be retained;

(k) receiving from the first party retained search data representative of the search data to be retained;

(l) storing on the storage means the retained search data in its respective time slot of the topic record;

(m) making the topic record available to one or more predetermined second parties; and (n) providing the opportunity for the predetermined second parties to perform steps (e)–(l), above.

2. The method of claim 1, further comprising the step of: creating link data representative of links between the retained data.

3. The method of claim 1, wherein said searching step includes the step of searching one or more type of search data selected from the group consisting of: text, audio, database, image, numeric, diagnostic and CAD.

4. The method of claim 1, further comprising the steps of:

displaying the retained data to the first party;

prompting the first party to edit the retained data;

receiving from the first party selection data representative of the selected retained data to be edited;

allowing the first party to edit the selected retained data; and storing the edited retained data.

5. The method of claim 1, further comprising the initial steps of:

prompting the first party to input a topical outline of the instructional materials; receiving from the first party outline data representative of the topical outline;

prompting the first part to select a first topic from the topical outline; and receiving from the first user topic data representative of the first topic selected.

6. The method of claim 1, wherein the instruction data is one or more type of data selected from the group consisting of: background, text, audio, image, chart, CAD, numeric and diagnostic.

7. The method of claim 1, further comprising the steps of:

creating optional second and subsequent topic records representative of second and subsequent topics, in the manner of steps (b)–(l), above.

8. The method of claim 1, further comprising the steps of:

receiving from a user command data representative of a command to be performed on the data of a particular time slot of the topic record, the user being the first party or the second and subsequent parties.

9. The method of claim 8, further comprising the steps of:

in response to command data representative of a "play" command, retrieving from the storage means the data for the plurality of fields of the particular time slot and time slots for later time periods; and displaying the data from the plurality of fields in consecutive order of the time period from earliest to latest.

10. The method of claim 8, further comprising the steps of:

in response to command data representative of a "fast forward" command, retrieving from the storage means the data for the plurality of fields of the particular time slot and time slots for later time periods; and quickly displaying the data from the plurality of fields in consecutive order of the time from the plurality of fields in consecutive order of the time period from earliest to latest.

11. The method of claim 8, further comprising the steps of:

in response to command data representative of a "rewind" command, retrieving from the storage means the data for the plurality of fields of the particular time slot and time slots for earlier time periods; and displaying the data from the plurality of fields in consecutive order of the time period from latest to earliest.

12. The method of claim 8, further comprising the steps of:

in response to command data representative of a "record" command, receiving from the user additional instruction data for a plurality of consecutive time periods.

13. The method of claim 8, further comprising the steps of:

in response to command data representative of a "search" command, prompting the user to input criteria data;

receiving from the user the criteria data;

searching one or more storage means of the computer system for search data associated with the criteria data;

displaying the search data to the user;

prompting the user to select the search data to be retained;

receiving from the user retained search data; and storing the retained search data in its respective time slot of the first topic record.

14. The method of claim 1, wherein said searching step searches a storage means selected from the group consisting of: a CD-Rom, a hard disk, a tape and a floppy disk.

15. The method of claim 1, wherein said searching step searches a storage means comprising a Website (Home Page).

16. The method of claim 1, wherein said storing steps store the data on a storage means selected from the group consisting of: a CD-Rom, a hard disk, a tape and a floppy disk.

17. A method of managing data on a computer system, said method comprising the steps of:

(a) retrieving from a storage means in the computer system a topic record, the topic record including a plurality of fields for storing instruction data representative of data from a presentation and search data representative of data obtained in response to a search request, and wherein each of the plurality of fields includes a plurality of time slots representative of a plurality of time periods;

(b) displaying the data from the plurality of fields in consecutive order of the time period from earliest to latest;

(c) receiving from a user a request to search for search data for a particular time slot;

(d) prompting the user to input a search criteria related to the search data to be searched;

(e) receiving from the user criteria data representative of the search criteria;

(f) searching storage accessible by the computer system for search data associated with the criteria data;

(g) displaying the search data to the user;

(h) prompting the user to select the search data to be retained;

(i) receiving from the user an indication of the search data to be retained; and (j) storing the search data in its respective field and time slot of the topic record.

18. The method of claim 17, further comprising the steps of:

receiving from the user command data representative of a command to be performed on data of a particular time slot from the topic record.

19. The method of claim 18, further comprising the steps of:

in response to command data representative of a "play" command, retrieving the data for the plurality of fields of the particular time slot and time slots for later time periods; and displaying the data from the plurality of fields in consecutive order of time period from earliest to latest.

20. The method of claim 18, further comprising the steps of:

in response to command data representative of a "fast forward" command, retrieving the data for the plurality of fields of the particular time slot and time slots for later time periods; and quickly displaying the data from the plurality of fields in consecutive order of the time from the plurality of fields in consecutive order of the time period from the earliest to the latest.

21. The method of claim 18, further comprising the steps of:

in response to command data representative of a "rewind" command, retrieving the data for the plurality of fields of the particular time slot and time slots for earlier time periods; and displaying the data from the plurality of fields in consecutive order of the time period from latest to earliest.

22. The method of claim 18, further comprising the steps of:

in response to command data representative of a "search" command, continuously displaying the data from the plurality of fields for the current time slot; prompting a user to input a search criteria;

receiving from the user criteria data representative of the search criteria;

searching the storage means of the computer network for search data associated with the criteria data; and displaying the search data to the user;

prompting the user to select the search data to be retained;

receiving from the user retained search data representative of the search data to be retained; and storing the retained data and link data representative of the links between the retained data.

23. The method of claim 22, further comprising the steps of:

displaying the associated data to the user;

prompting the user to edit the retained data;

receiving from the user selection data representative of the selected retained data to be edited;

allowing the user to edit the selected retained data; and storing the edited associated data.

24. A method for managing computer-readable data comprising the steps of:

(a) a first party creating a topic record representative of a topic, wherein the topic record includes a plurality of fields for storing instruction data and a plurality of fields for storing retained search data, wherein each of the plurality of fields includes a plurality of time slots representative of a plurality of time periods;

(b) receiving and selectively storing instruction data into the topic record;

(c) searching a computer accessible storage location for search data associated with a search criteria;

(d) receiving and selectively storing the search data into the topic record, thereby creating retained search data;

(e) providing the topic record comprising the instruction data and the retained search data to the first party for editing; and (f) providing the topic record to a second or subsequent party for execution of a command.

* * * * *